(12) United States Patent
Cai et al.

(10) Patent No.: US 8,856,129 B2
(45) Date of Patent: Oct. 7, 2014

(54) FLEXIBLE AND SCALABLE STRUCTURED WEB DATA EXTRACTION

(75) Inventors: Rui Cai, Beijing (CN); Lei Zhang, Beijing (CN); Qiang Hao, Tianjin (CN)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 13/237,142

(22) Filed: Sep. 20, 2011

(65) Prior Publication Data

US 2013/0073514 A1    Mar. 21, 2013

(51) Int. Cl.
G06F 17/30 (2006.01)

(52) U.S. Cl.
USPC ........... 707/738; 707/748; 709/203; 709/219; 706/46

(58) Field of Classification Search
CPC .................... G06Q 30/0256; Y10S 707/99936
USPC .............. 707/738, 748; 709/203, 219; 706/46
See application file for complete search history.

(56) References Cited

U.S. PATENT DOCUMENTS

| | | | |
|---|---|---|---|
| 7,409,393 B2 | 8/2008 | Gregoire et al. | |
| 7,644,052 B1 * | 1/2010 | Chang et al. | 706/45 |
| 7,765,236 B2 | 7/2010 | Zhai et al. | |
| 8,239,335 B2 * | 8/2012 | Schmidtler et al. | 706/20 |
| 8,560,518 B2 * | 10/2013 | Bangalore et al. | 707/708 |
| 2006/0253582 A1 * | 11/2006 | Dixon et al. | 709/225 |
| 2006/0277175 A1 * | 12/2006 | Jiang et al. | 707/5 |
| 2008/0065471 A1 * | 3/2008 | Reynolds et al. | 705/10 |
| 2008/0270334 A1 | 10/2008 | Ma et al. | |
| 2009/0012946 A1 | 1/2009 | Tsunokawa | |
| 2009/0055359 A1 * | 2/2009 | Gross | 707/3 |
| 2010/0205057 A1 * | 8/2010 | Hook et al. | 705/14.52 |
| 2010/0211533 A1 | 8/2010 | Yang et al. | |
| 2010/0241639 A1 * | 9/2010 | Kifer et al. | 707/754 |
| 2011/0184817 A1 * | 7/2011 | Yankov et al. | 705/14.73 |
| 2012/0078895 A1 * | 3/2012 | Chu-Carroll et al. | 707/728 |
| 2013/0013644 A1 * | 1/2013 | Sathish et al. | 707/792 |

OTHER PUBLICATIONS

"An Entity Graph of People, Places and Things, Built by a Community that Loves Open Data," obtained from http://www.freebase.com/, May 24, 2011, 1 page.
Arasu et al., "Extracting Structured Data from Web Pages," SIGMOD 2003, Jun. 9-12, 2003, San Diego, CA, 12 pages.
Carlson et al., "Bootstrapping Information Extraction from Semi-structured Web Pages," published in the Proceedings of the European Conference on Machine Learing and Principles and Practice of Knowledge Discovery in Databases, Oct. 2008, 16 pages.
Chang et al., "IEPAD: Information Extraction Based on Pattern Discovery," WWW10'01, May 1-5, 2001, Hong Kong, pp. 681-688.

(Continued)

*Primary Examiner* — Leslie Wong
(74) *Attorney, Agent, or Firm* — Carole Boelitz; Micky Minhas; Lee & Hayes PLLC (57) ABSTRACT

This document describes techniques that label text nodes of a seed site for each of a plurality of verticals. Once a seed site is labeled for a given vertical, the techniques extract features from the labeled text nodes of the seed site. The techniques learn vertical knowledge for the seed site based on the human labels and the extracted features, and adapt the learned vertical knowledge to a new web site to automatically and accurately identify attributes and extract attribute values targeted within a given vertical for structured web data extraction.

18 Claims, 8 Drawing Sheets

(56) References Cited

OTHER PUBLICATIONS

Crescenzi et al., "RoadRunner: Towards Automatic Data Extraction from Large Web Sites," Proceedings of the 27th VLDB Conference, Roma, Italy, Sep. 2001, 10 pages.

Dill et al., "SemTag and Seeker: Bootstrapping the semantic web via automated semnantice annotation," IBM Almaden Research Center, WWW2003, May 20-24, 2003, Budapest, Hungary, 9 pages.

"Document Object Model," from Wikipedia, the free encyclopedia, obtained from http://en.wikipedia.org/wiki/DocumentObject Model, May 24, 2011, 5 pages.

Kushmerick, "Wrapper Induction for Information Extraction," University of Washington, PhD of Thesis, Proceedings of the Fifteenth International Joint Conference on Artificial Intelligence, Aug. 1997, 260 pages.

Liu et al., "Mining Data Records in Web Pages," SIGKDD '03, Aug. 24-27, 2003, Washington, DC, USA, 6 pages.

"MSHTML Reference," obtained from http://msdn.microsoft.com/en-us/library/aa74137(d=printer,v=VS.85).aspx, May 25, 2011, 1 page.

Muslea et al., "A Hierarchical Approach to Wrapper Induction," University of Southern California, In Proc. Agents, May 1999, 8 pages.

Soderland, "Learning Information Extraction Rules for Semi-structured and Free Text," In Proceedings of Machine Learning, Jun. 1999, Kluwer Academic Publishers, Boston, 44 pages.

Vidal et al., "Structure-Driven Crawler Generation by Example," SIGIR'06, Aug. 6-11, 2006, Seattle, Washington, USA, 8 pages.

Wong et al., "Learning to Adapt Web Information Extraction Knowledge and Discovering New Attributes via a Bayesian Approach," IEEE Transactions on Knowledge and Data Engineering, vol. 22, No. 4, Apr. 2010, 14 pages.

Wong et al., "Mining Employment Market via Text Block Detection and Adaptive Cross-Domain Information Extraction," SIGIR'09, Jul. 19-23, 2009, Boston, Massachusetts, USA, 8 pages.

Yang et al., An Information Extraction System of B2B Based on Knowledge Base on Knowledge Base, Proceedings: E-Business and Information System Security, May 2009. EBISS '09, 4 pages.

Yang et al., "Incorporating Site-Level Knowledge to Extract Structured Data from Web Forums," WWW 2009, Apr. 20-24, 2009, Madrid, Spain, 10 pages.

Zhai et al., "Structured Data Extraction from the Web Based on Partial Tree Alignment," IEEE Transactions on Knowledge and Data Engineering, vol. 18, No. 12, Dec. 2006, 15 pages.

Zhai et al., "Web Data Extraction Based on Partial Tree Alignment," WWW 2005, May 10-14, 2005, Chiba, Japan, 10 pages.

Zheng et al., "Joint Optimization of Wrapper Generation and Template Detection," KDD'07, Aug. 12-15, 2007, San Jose, California, USA, 9 pages.

Zhu et al., "2D Conditional Random Fields for Web Information Extraction," in Proceedings of the 22nd International Conference on Machine Learning, Bonn, Germany, Jun. 2005, 8 pages.

Zhu et al., Simultaneous Record Detection and Attribute Labeling in Web Data Extraction, KDD'06, Aug. 20-23, 2006, Philadelphia, Pennsylvania, USA, 10 pages.

* cited by examiner

Fig. 8

FLEXIBLE AND SCALABLE STRUCTURED WEB DATA EXTRACTION

BACKGROUND

Extracting structured web data from various different types of web pages or web sites provides a rich web resource for online search engines and online knowledge databases. For example, efficient and accurate web data extraction can provide an advantageous online tool when performing: market research, product information analysis, sales information analysis, an analysis of a competitor's sale or product information, monitoring a particular type of web data, aggregating a particular type of web data, collecting large volumes of web data, collecting product information, search query results, etc.

Structured web data is often extracted according to different categories of entities sharing similar sets of attributes. The different categories of entities are called verticals. For example, when performing a product or service information search, an online search engine or online knowledge database may seek to collect information and attributes for different verticals such as books, restaurants, cars, or cameras. In each vertical, there typically are hundreds or even thousands of web sites that may contain content targeted during the product or service information search. As an example, structurally extracting targeted attributes for a vertical such as a book may include identifying values for a title, an author, and a publisher of numerous books accessible via the web sites.

To extract the structured web data from the numerous web sites, conventional systems employ a manual labeling approach or a template approach that relies on manual annotation of a template. However, these approaches lack cost effectiveness because they require a considerable amount of human time and effort.

SUMMARY

The techniques described herein include labeling text nodes of a seed site for each of a plurality of verticals. The labeled text nodes are associated with a specified or predefined set of attributes for a given vertical. Once a seed site is labeled for a given vertical, the techniques extract features from the labeled text nodes of the seed site. The techniques learn vertical knowledge for the seed site based on the human labels and the extracted features, and adapt the learned vertical knowledge to a new web site (i.e. an unseen web site yet to be labeled or have its web data extracted) to automatically and accurately identify attributes and extract attribute values targeted within a given vertical for structured web data extraction.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

The following description sets forth arrangements and techniques for automatically identifying and extracting structured web data for a given vertical. The web data extracted for a given vertical is associated with a set of target attributes. The arrangements and techniques discussed herein provide a solution for structured web data extraction that: can be flexibly applied to different verticals (i.e. vertical independent), is scalable to deal with a variety of web sites in each separate vertical, and is automatic so that human involvement is significantly reduced and/or limited.

Based on a labeled seed site of a given vertical, some implementations herein extract a general set of features and learn vertical knowledge for the given vertical using the labels and the extracted features. Some implementations may then apply the learned knowledge to a new web site to identify and extract target attributes for structured web data extraction.

Figure 1:
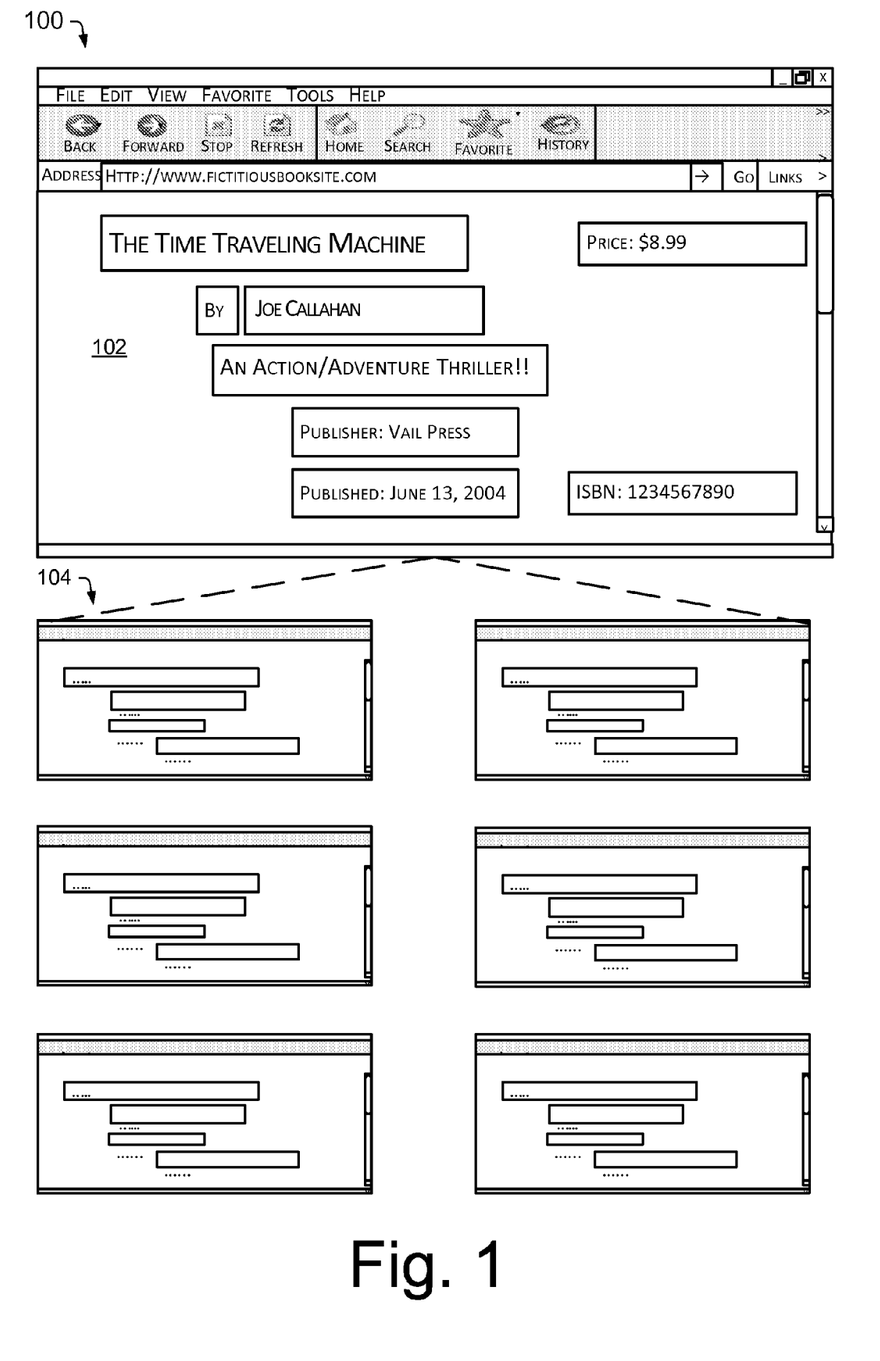
FIG. 1 illustrates a set of web sites within an example book vertical, in accordance with various embodiments described herein.

FIG. 1 illustrates an example vertical 100 relating to various web sites that have product information relating to a book. The display screen shot 102 of a web page displays different book attributes for a particular book. As previously discussed, there may be hundreds or even thousands of different web sites 104 that present product information relating to books, and the product information from each web site is valuable to online search engines and online knowledge databases. Further, each web site may include hundreds or even thousands of different web pages. For example, an online book selling web site may have individual web pages for each book currently available via their web site.

Figure 2:
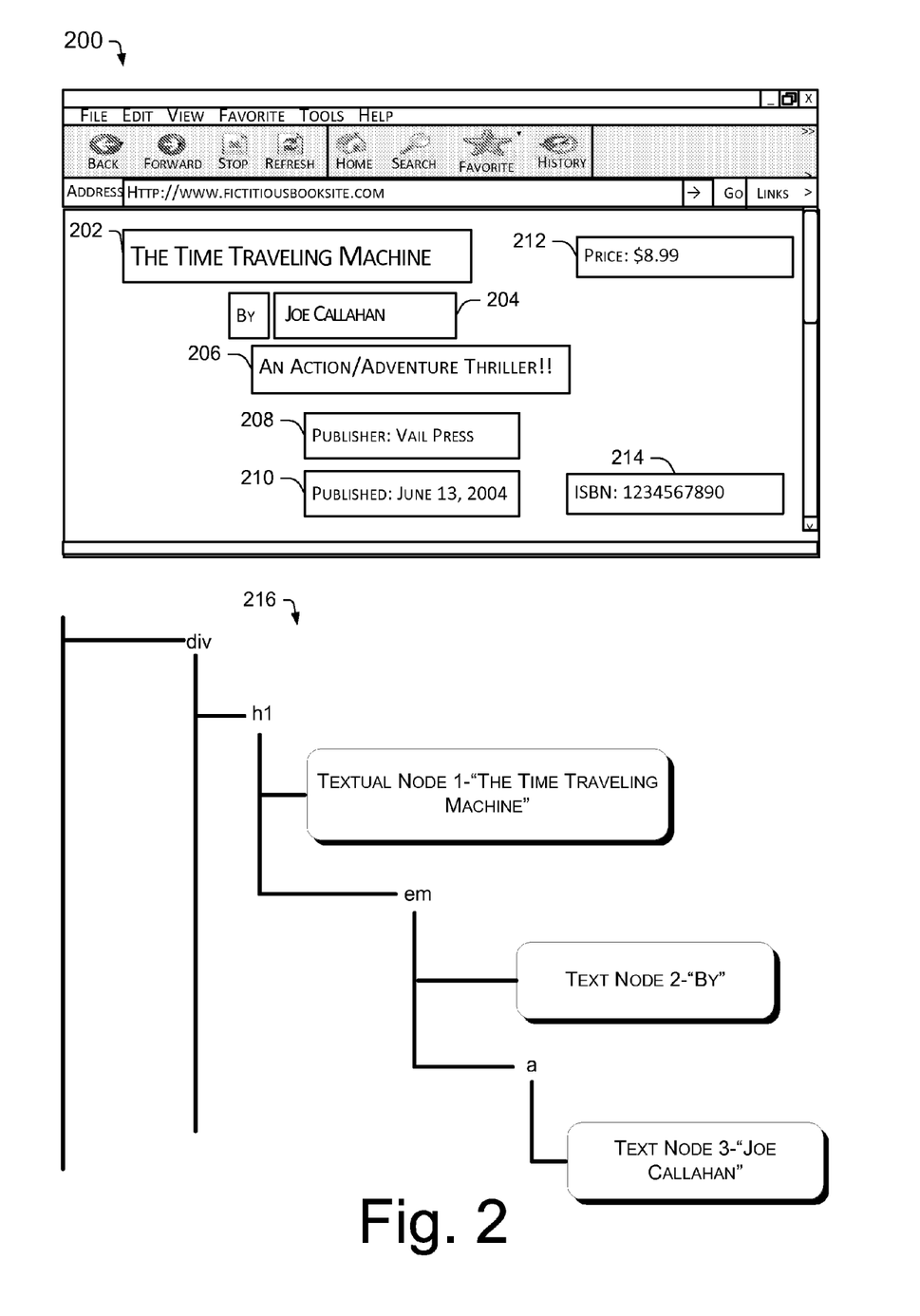
FIG. 2 illustrates attributes for an example book web page, and a partial Domain Object Model (DOM) tree corresponding to select text nodes, in accordance with various embodiments described herein.

As illustrated in FIG. 2, common book attributes presented on a web page 200 may include, but are not limited to, a title 202, an author 204, a genre/type 206, a publisher 208, a book publishing date 210, a price listing 212, and an international standard book number (ISBN) 214. These attribute values may be selectively repeated and/or provided for multiple different books and multiple different web pages across the multiple different web sites 104 in FIG. 1. Indeed, the same book may also be listed and presented across the multiple different web sites 104.

While FIGS. 1 and 2 illustrate a book entity as the vertical, it is understood that the subject matter illustrated in FIGS. 1 and 2 is used throughout this document for example purposes only. Thus, it is understood in the context of this document, that the techniques discussed herein can be used in association with numerous different verticals (e.g., cars, restaurants, cameras, computers, cell phones, professional player profiles, celebrity biographies, movies, etc.), which may individually have similar and consistent attributes, within their respective verticals, targeted by online search engines and online knowledge databases for structured web data extraction.

Again, accurately identifying attributes and extracting values for the targeted attributes within a given vertical may be advantageous to online search engines and online knowledge databases. Conventional systems employ a manual labeling approach or a template approach that relies on manual annotation of a template. However, neither of these approaches is feasible for thousands of web sites with numerous web pages because of the considerable amount of human effort required.

FIG. 2 further illustrates a Domain Object Model (DOM) tree representation 216 for the subject matter depicted on the web page directly above. The DOM tree representation 216 is a partial representation corresponding to three selected text nodes presented on the web page 200. The DOM tree 216 is used and referenced by the techniques discussed herein.

Automatically and correctly identifying values of vertical attributes for structured web data extraction from a new web site is a difficult task. For example, different web pages within a given vertical often have different values for the same attribute, which makes it difficult to identify the values for correct and consistent extraction. A value, as used in the context of this document, is the subject matter presented on a web site for an attribute within a given vertical targeted for extraction (e.g., "Joe Callahan" is a value for the book attribute "author" 204). For two different web sites advertising the same book for sale, a book author may be presented on the first web site as an abbreviated name (e.g., "J. Callahan"), and on the second web site as a full name (e.g., "Joe Callahan"). In another example, the same web site may sell two different books, presented via two different web pages, by Joe Callahan, one listing his name in the abbreviated format and the other listing his name in the full format. Further, different web sites often present the same or similar attributes with different web layouts (i.e., the attribute is not presented in a consistent position within the web layouts of two different web sites). Even further, web sites often contain noisy content along with the attributes targeted. The noisy content is text or web content that may not be targeted for extraction by online search engines and online knowledge databases, or text that may not be helpful. This noisy content makes it difficult to accurately identify and extract the correct attributes targeted by the online search engines or the online knowledge database.

The techniques described herein provide a flexible and scalable approach to structured web data extraction that can be applied to and adapted for any arbitrary vertical. As discussed herein, the features extracted and used to learn vertical knowledge are general features designed to characterize semantic and layout knowledge for an arbitrary vertical. Thus, unlike conventional systems, the features are flexible and may be successfully applied to web sites and web pages in various different verticals, thereby making structured web data extraction more efficient and cost effective.

Figure 3:
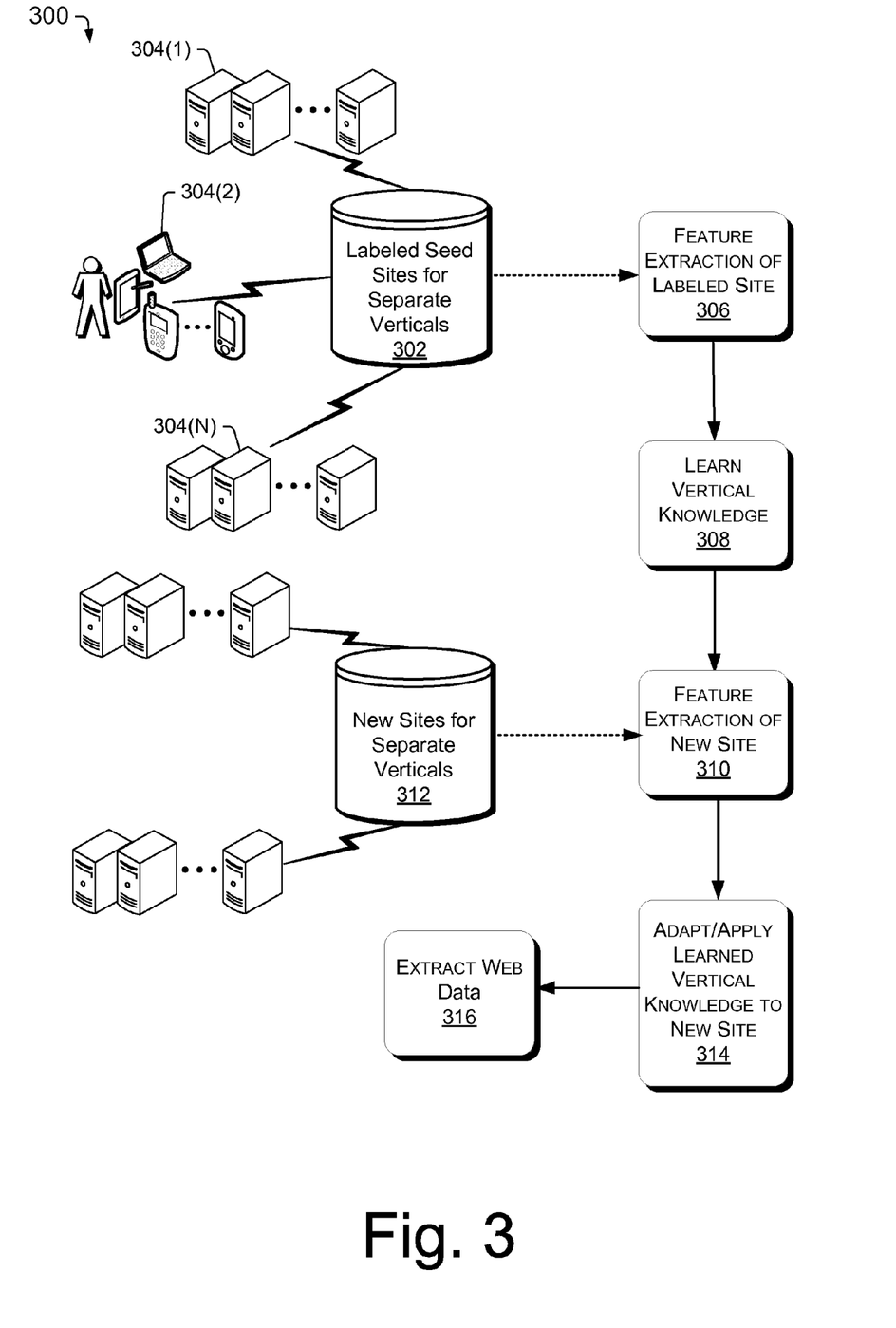
FIG. 3 illustrates an example diagram providing seed site(s) and new web sites for feature extraction and learning vertical, in accordance with various embodiments.

FIG. 3 illustrates an example block diagram illustrating an environment 300 that extracts structured web data. As shown at 302, a database stores labeled seed sites for each of a plurality of separate verticals (e.g., one seed site for each of: cars, restaurants, cameras, computers, cell phones, professional player profiles, celebrity biographies, movies, etc.). The potential seed sites may be collected from one or more sources and selected for labeling by one or more persons 304(1), 304(2), . . . , 304(N). In another embodiment, the seed sites may be automatically selected. For example, a system or person may identify a web site that is well known to web users, or a web site that hosts the most web traffic for a given vertical (e.g., sells the most books online). Once a seed site is identified and selected for a given vertical, the one or more persons may manually label the seed site. For example, the one or more persons may label the DOM tree 216 illustrated in FIG. 2, by identifying text node 1 as the title 202, text node 2 as noisy content or preceding text as discussed herein, and text node 3 as the author 204. In various embodiments, the one or more persons label the text nodes associated with a specified or predefined set of attributes within a given vertical targeted for web data extraction.

In various embodiments, only one seed site is labeled for each separate vertical. In another embodiment, a limited number of seed sites (e.g., two, three, or four) may be labeled for each separate vertical. However, in either scenario, the human involvement element for structured web data extraction is reduced significantly compared to conventional approaches.

Once the seed site(s) are labeled, the system extracts feature information of a labeled seed site for a given vertical at 306. The features are described in further detail below. Then, using the extracted features and the human labels from the seed site for the given vertical, the system learns vertical knowledge at 308. At 310, the system receives a new web site and extracts features of the new web site in the same vertical (i.e. an unseen web site not yet labeled). The new web site may be a web site found online or may be part of a group of identified web sites for the given vertical, stored in a database 312. In various embodiments, a plurality of web sites in the respective verticals may be separated and grouped by a software program configured to crawl the World Wide Web and search for candidate web sites.

At 314, the system applies the learned vertical knowledge to the new web site, and at 316, the system identifies targeted vertical attributes and extracts attribute values from the new web site.

Illustrative Architecture

Figure 4:
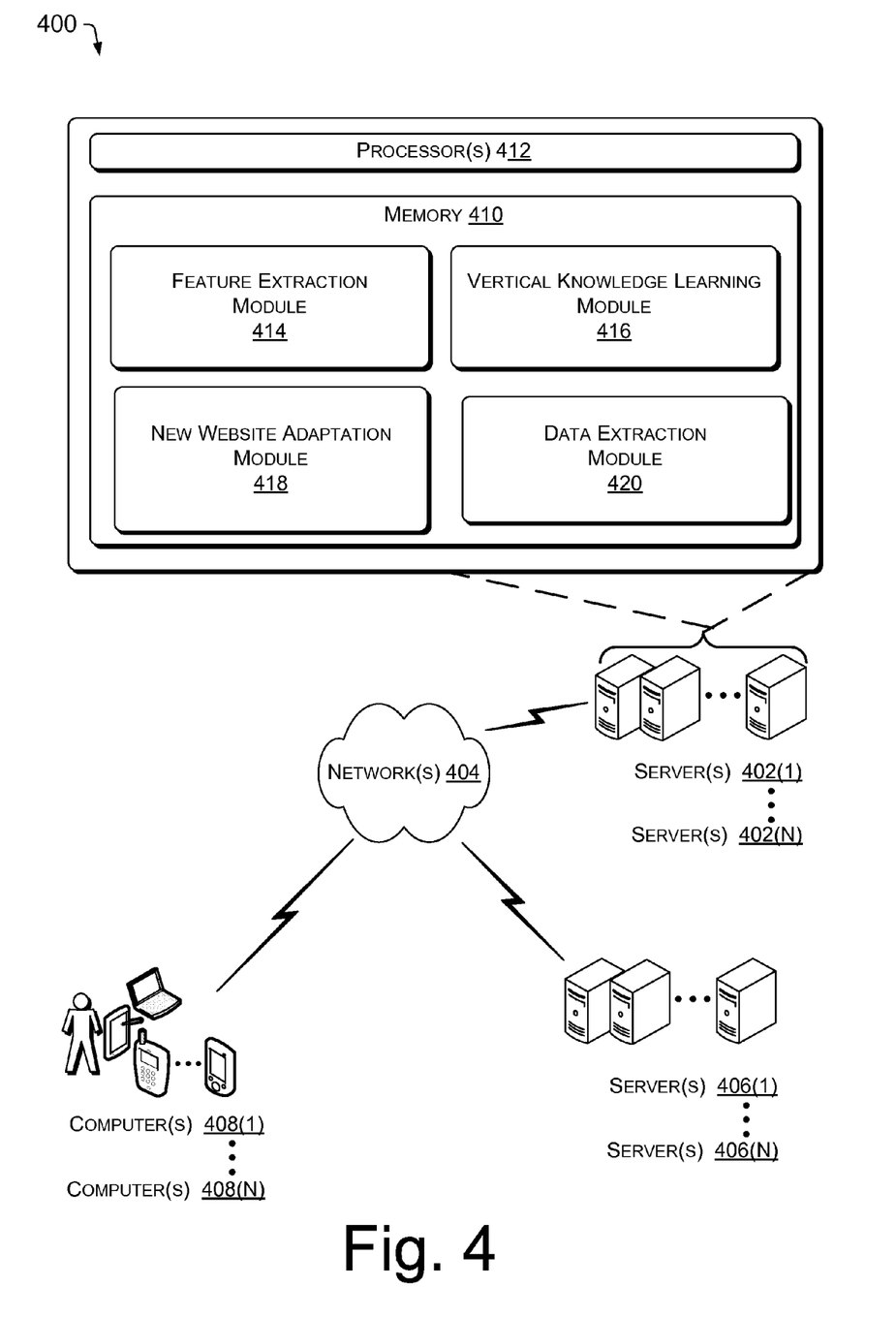
FIG. 4 illustrates an example architecture for implementing the described techniques, in accordance with various embodiments.

FIG. 4 shows an illustrative architecture 400 that may employ the described techniques. To this end, architecture 400 includes one or more server computing devices 402(1) . . . 402(N) communicating through network(s) 404 with one or more sources of web content (e.g., different web sites) 406(1) . . . 406(N), and one or more client computing devices 408(1) . . . 408(N). In various embodiments, the server computing devices 402(1) . . . 402(N) may include one or more online search engines and/or online knowledge databases that seek to extract structured web data. In various embodiments, the extracted web data may be made accessible by, or provided to, the one or more client computing devices 408(1) . . . 408(N). The client computing devices 408(1) . . . 408(N) may comprise one of an array of computing devices capable of connecting to the one or more network(s) 404, such as a server computer, a client computer, a personal computer, a laptop computer, a mobile phone, a personal digital assistant (PDA), tablets, gaming consoles, set top boxes, and the like.

In various embodiments, architecture 400 can be the World Wide Web, including numerous PCs, servers, and other computing devices spread throughout the world. The server computing devices 402(1) . . . 402(N), the one or more sources of web content 406(1) . . . 406(N), and the client computing devices 408(1) . . . 408(N) may be coupled to each other in various combinations through a wired and/or wireless network 404, including a LAN, WAN, or any other networking technology known in the art.

The server computing devices 402(1) . . . 402(N) comprise a memory 410 and one or more processors 412. Furthermore, the server computing devices 402(1) . . . 402(N) may include a feature extraction module 414, a vertical knowledge learning module 416, a new web site adaptation module 418, and a data extraction module 420, each of which are further discussed herein.

Figure 5:
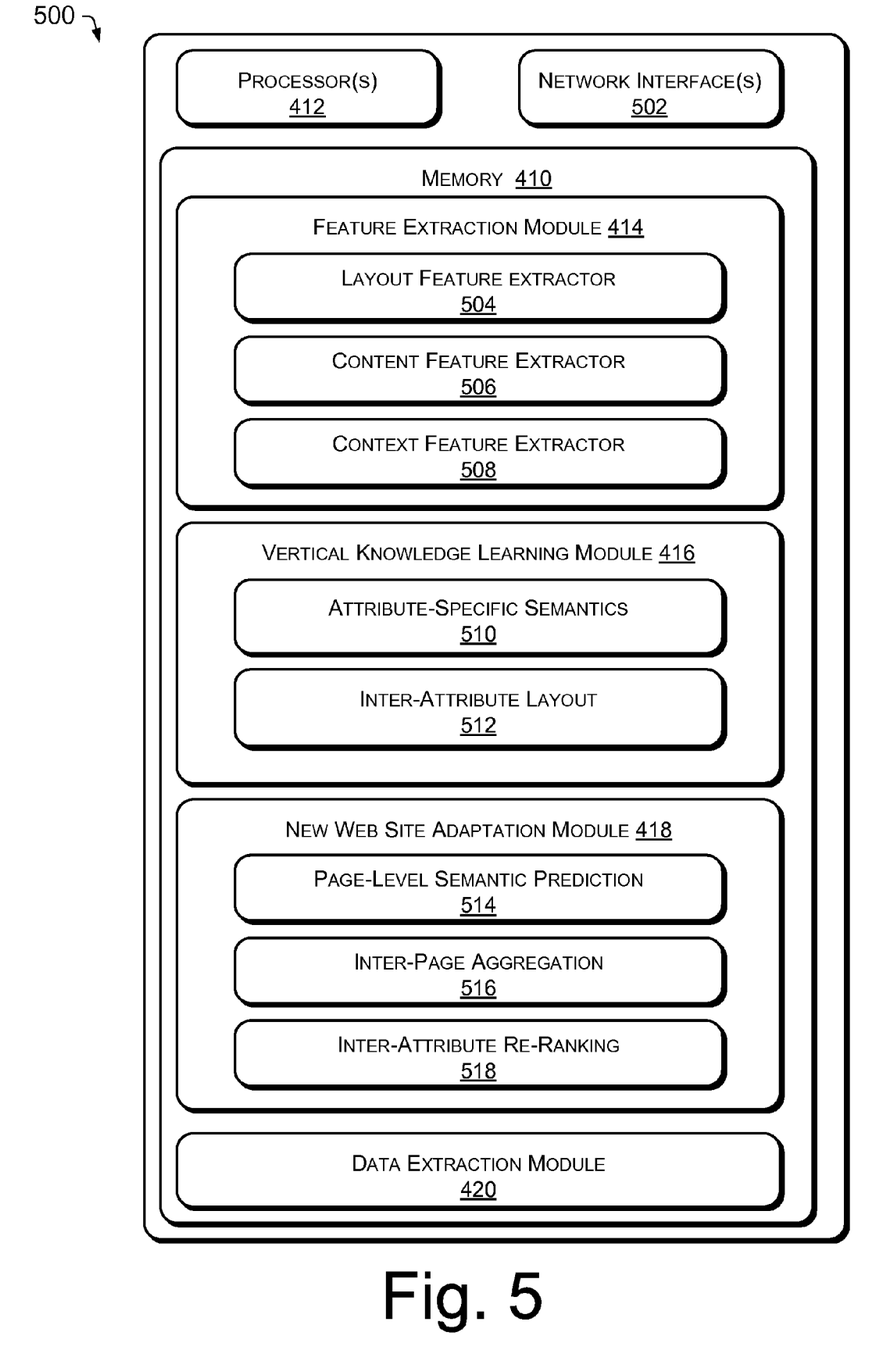
FIG. 5 further illustrates an example computing system for implementing the described techniques, in accordance with various embodiments.

In the context of this document, the functionality performed by the feature extraction module 414, the vertical knowledge learning module 416, the new web site adaptation module 418, and the data extraction module 420 may be i) implemented on a single server computing device, ii) spread across a plurality of server computing devices, or iii) spread across at least one server computing device and at least one client computing device, The example computing system 500 in FIG. 5 further illustrates the one or more server computing devices 402. The example computing system 500 includes one or more network interfaces 502. The processor(s) 412 may be a single processing unit or a number of units, all of which could include multiple computing units. The processor(s) 412 may be implemented as one or more microprocessors, microcomputers, microcontrollers, digital signal processors, central processing units, state machines, logic circuitries, and/or any devices that manipulate signals based on operational instructions. Among other capabilities, the processor(s) 412 may be configured to fetch and execute computer-readable instructions stored in the memory 410.

The memory 410 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 502 enable network communication, and may include one or more ports for connecting the device to the network 404. The network interface(s) 502 can facilitate communications within a wide variety of networks and protocol types, including wired networks (e.g. LAN, cable, etc.) and wireless networks (e.g. WLAN, cellular, satellite, etc.).

Feature Extraction Module

As illustrated in FIG. 5, the feature extraction module 414 includes a layout feature extractor 504, a content feature extractor 506, and a context feature extractor 508 that are each separately configured to extract features for a received web site (e.g., either a seed site or a new web site as discussed with respect to FIGS. 1-3). The modules 504, 506, and 508 may be used independently or in combination to extract a set of features for the received web site.

Feature extraction takes multiple different web pages from the same web site as input, parses the input from each web page into a DOM tree, and outputs a set of text nodes for each web page (i.e. leaf nodes with text-type values). For example, each web page within the web site may be represented as a DOM tree 216 similar to that illustrated in FIG. 2. The set of text nodes are then analyzed, evaluated, and associated with layout, content, and context features, as discussed herein.

Layout features describe the properties of individual text nodes as a visual element on a display screen of a computing device, when the visual element is rendered via a web browser. Layout information helps characterize both the intra-page and inter-page relationships between text nodes in a given vertical. These relationships help identify target attributes and extract the target attribute values.

The layout feature extractor 504 is configured to leverage three types of layout features. It is understood in the context of this document, that the layout feature extractor 504 may selectively leverage one, two, or all three of the different types of layout features discussed herein.

In various embodiments, the layout feature extractor 504 leverages a DOM path of a text node. The DOM path of a text node is a root-to-leaf tag path that characterizes a location of a text node in the DOM tree of a web page. For example, the DOM path of text node 3 in FIG. 2 may be: /html/body/div/h1/em/a/text.

In various embodiments, the layout feature extractor 504 leverages a visual size of a text node. The visual size of the text node is denoted as a pair indicating the width and height of a bounding box for the textual value contained in the text node when the web content is rendered and presented on a display screen via a web browser. In one embodiment, the width and height are measured in pixels. For example, the visual size of text node 3 in FIG. 2 may be: {width($t_3$), height($t_3$)} or {80, 16}. The bounding box of a text node may be retrieved using programming interfaces provided by web browsers.

In various embodiments, the layout feature extractor 504 leverages a visual position of a text node. The visual position of the text node is the 2-D coordinates of the top-left vertex of the text node bounding box. The 2-D coordinates is also denoted as a pixel pair: {left(t), top(t)}. However, it is understood in the context of this document, that any of the four corners of a textual bounding box may be used to identify a visual position, such as left/bottom, right/top, or right/bottom.

Content features correspond to the textual values contained in the individual text nodes of the DOM tree. Content information helps characterize the semantics of the individual text nodes for a given vertical.

The content feature extractor 506 is configured to leverage five types of content features. It is understood in the context of this document, that the content feature extractor 506 may selectively leverage one, two, three, four, or all five of the different types of content features discussed herein.

In various embodiments, the content feature extractor 506 leverages a unigram set of a text node. Within each separate vertical, there may be one or more targeted attributes corresponding to textual values that come from a limited lexicon (e.g., "NBA team" for a player profile). The targeted attributes may contain representative terms that are commonly and frequently found across multiple web pages and different web sites within a given vertical (e.g., the term "press" is very common within the values of the attribute "book publisher"). These limited lexicons and representative terms may be pre-defined, known in advance, or determined from data extraction, and they may help identify certain attributes targeted for a given vertical. Therefore, the unigram set of a text node is a general feature implemented to characterize such common and frequent information. Specifically, the unigram set of a text node t is defined as the set of tokens in $v_t$, $$\text{unigram}(t) = \{w | w \in v_t\}. \quad (1)$$

Here, $v_t$ is the textual value of t split into tokens $\{w\}$ using whitespace characters as separators. Thus, the content feature extractor 506 extracts a unigram set for each individual text node in the DOM tree.

In various embodiments, the content feature extractor 506 leverages a token count of a text node. It is often common for targeted attributes of a given vertical to include either a fixed number of tokens or a relatively fixed number of tokens (i.e. a small range). For example, an author name usually has two tokens, and most likely does not have more than four tokens. Therefore, the token count of a text node t is a numerical feature, defined as, $$\text{Token\_count}(t) = |\text{unigram}(t)|. \quad (2)$$

Here, the tokens may be separated and counted according to any defined separators or symbol including, but not limited to, a "space", /, \, -, _, etc., or any combination thereof.

In various embodiments, the content feature extractor 506 leverages a character count of a text node. The content feature extractor 506 leverages a character count because it may be helpful to go beyond token-level granularity (e.g., the token count). For example a thirteen digit ISBN of a book and a ten digit ISBN of a book, both have only one token, but they have different character counts (i.e. 13 and 10, respectively). Therefore, a character count of a text node provides a finer granularity. The character count of a text node t is defined as, $$\text{Char\_count}(t) = \Sigma_{w \in \text{unigram}(t)} \text{number\_of\_characters}(w). \quad (3)$$

In various embodiments, the content feature extractor 506 leverages a character type of a text node. Often, a variety of attributes correspond to values composed of specific types of characters. For example, values for an attribute "price" often contain one or more common symbols, e.g., $, ¢, €, £. To be flexible to various attributes, the content feature extractor 506 leverages three general character types: letter, digit (i.e. number), and symbol (character categories well known in the art). The content feature extractor 506 defines the character type of a text node t as a vector that separates the proportion of each character type among all non-whitespace characters in the text $v_t$ of t, $$\text{char\_type}(t) = (c_t^{letter}, c_t^{digit}, c_t^{symbol}). \quad (4)$$

Here $c_t^*$ is the portion of corresponding character types for the text node t.

In various embodiments, the content feature extractor 506 leverages a page redundancy of a text node. Often, within each separate vertical certain attributes have redundant values, or a limited number of values. For example, in the book vertical, the attribute "genre/type" probably is limited to a set of different types of books (i.e., different textual "values" such as children, fantasy, horror, romance, etc.) that an online book store may have for sale. These values are redundant when extracting the "genre/type" attribute from multiple web pages and multiple web sites in the book vertical. Therefore, value redundancies of text nodes among web pages may help predict the semantics of such text nodes. Given a set of input web pages, the page redundancy of a text node t is defined as, $$\text{page\_redundancy}(t) = |P_{v_t}|/|P_{all}|. \quad (5)$$

Here $P_{v_t}$ is the set of web pages that contain at least one text node with the value $v_t$, and $P_{all}$ is the entire set of input web pages.

Context features exploit site-level information and help capture the surrounding text indicating semantics of text nodes. For example, many web sites that present particular targeted attribute values for a given vertical may consistently surround the targeted attribute text with other common text. This surrounding text serves as site-level context that often occurs, or is found, with corresponding attribute values across multiple web pages. Thus, the surrounding text may further help identify attribute values.

The context feature extractor 508 is configured to leverage three types of context features (e.g., preceding text, prefix, and suffix). It is understood in the context of this document, that the context feature extractor 508 may selectively leverage one, two, or all three of the different types of context features discussed herein.

In various embodiments, the context feature extractor 508 extracts preceding text of a text node t, denoted as preceding (t). Preceding text is defined as the value of a text node t*, which is a separate text node in the DOM tree from t, e.g., text node 2, "by", that precedes the "author" text node 3 in FIG. 2. A preceding text node t* is i) located to the top, to the left, or to the top and left of t and within a rectangle proportional to the visual size of t, ii) associated with page redundancy that is sufficiently high (i.e. exceeding a certain threshold), and iii) closer to t than any other candidate text nodes that meet the criteria in (i) and (ii).

Thus, the preceding text node t* of text node t may be located within a certain distance from the visual position of t, and the maximum allowable distance is proportional to the visual size (e.g., height and width of a bounding box) of the text node t. The preceding text of a text node may be sufficiently redundant among web pages within a web site because the context is expected to be static at the site-level (i.e. across the multiple web pages in the web site). The page redundancy element may be measured in comparison to a set threshold (e.g., 50%) for the web pages within a web site.

The visual distance between two text nodes $t_1$ and $t_2$, when rendered by a web browser on a display screen, can be defined as, $$\text{VisDist}(t_1, t_2) = \sqrt{\text{Dist}_H(t_1, t_2)^2 + \text{Dist}_V(t_1, t_2)^2}. \quad (6)$$

Figure 6:
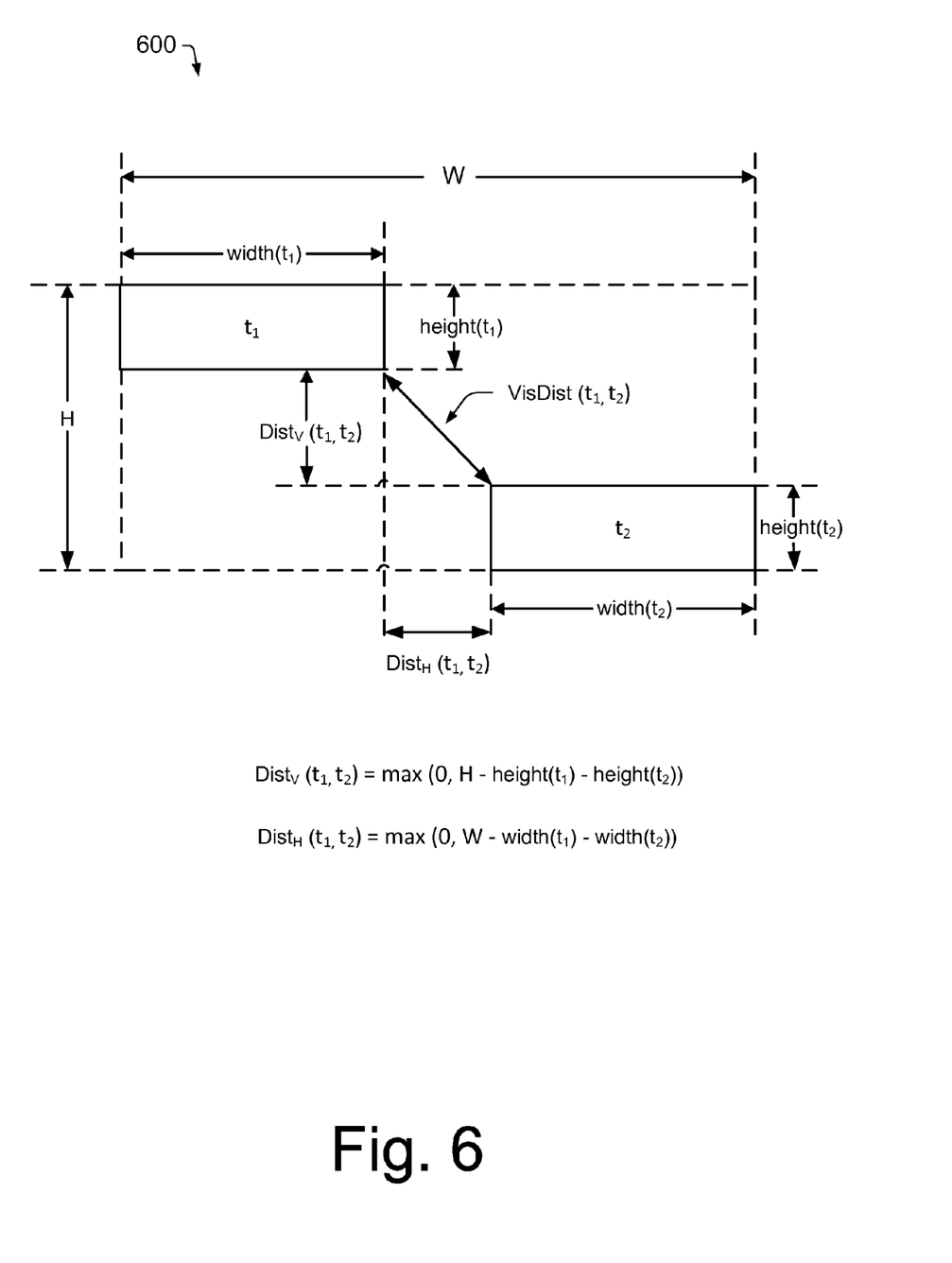
FIG. 6 illustrates a diagram that determines the distance between two next nodes, in accordance with various embodiments.

FIG. 6 illustrates a diagram 600 depicting two text nodes rendered on a web page. As depicted in FIG. 6, $\text{Dist}_V(t_1, t_2)$ corresponds to the separation of the two nodes in the vertical direction of a web page when the two nodes do not overlap (i.e., with reference to the bottom edge of the top most node $t_1$ and the top edge of the bottom most node $t_2$). As depicted via the max( ) operation in FIG. 6, $\text{Dist}_V(t_1, t_2)$ is computed using the height of the respective bounding boxes for each of $t_1$ and $t_2$. As previously discussed, the height of a bounding box for a text node rendered on a display screen can be determined in accordance with the visual size and/or visual position of a bounding box. Or, if $t_1$ and $t_2$ overlap and there is no separation in the vertical direction, then this value is zero as provided by the max( ) operation.

Similarly, as depicted in FIG. 6, $\text{Dist}_H(t_1, t_2)$ corresponds to the separation of the two nodes in the horizontal direction when the two nodes do not overlap (i.e., with reference to the right edge of the left most node $t_1$ and the left edge of the right most node $t_2$). $\text{Dist}_H(t_1, t_2)$ is computed using the width of the respective bounding boxes for each of $t_1$ and $t_2$ as previously discussed when determining the visual size and/or visual position of a bounding box. Or, if $t_1$ and $t_2$ overlap and there is no separation in the horizontal direction, then this value is zero by virtue of the max( ) operation shown in FIG. 6.

The visual distance between nodes may then be used to determine which text node, from multiple different text nodes, is closest to a particular text node t. When no preceding text node is identified, then preceding(t) is defined as null.

In various embodiments, the context feature extractor 508 extracts a prefix and/or suffix of a text node t, as denoted by prefix(t) and suffix(t). The prefix and suffix are defined as the beginning and ending textual sub-strings within an individual text node that are commonly and frequently shared by a number of text nodes across multiple web pages within a web site. For example, common prefixes and suffixes may include, but are not limited to, "Price:", "Weight:", "Length:", "USD", "EUR", "ounces", and "cm". Given a set of text nodes corresponding to multiple pages, the context feature extractor 508 extracts prefixes and suffixes features by first grouping values of text nodes in terms of rough formats. A rough format is obtained by evaluating and summarizing sets of successive letters, digits, and/or symbols, regardless of the character count within each succession. For example, the format for "2.364 cm" is {digit}.{digit} {letter}. Then for each group, the context feature extractor 508 clusters text nodes according to their specific sub-strings, or the actual textual values of the successive letters, digits, and symbols. Helpful prefixes and suffixes are then identified based on whether the individual clusters that include the specific sub-strings have text nodes on a sufficient proportion (e.g. 50%) of web pages within the web site.

Thus, the different feature extraction modules (504, 506, and 508) extract layout, content, and context features from multiple web pages within a web site that have been input and parsed into separate DOM trees. Once extracted from a labeled seed site, the general features first help learn vertical knowledge by characterizing both attribute-specific semantics and inter-attribute layout knowledge of a given vertical. Then, the different feature extraction modules are configured to extract features from a new web site so that the learned vertical knowledge can be adapted and applied, as discussed herein.

Vertical Knowledge Learning Module

As illustrated in FIG. 5, the vertical knowledge learning module 416 includes an attribute-specific semantics evaluator 510 and an inter-attribute layout relationships evaluator 512.

Given a vertical seed site with human labels and an associated set of m attributes targeted for structured web data extraction, which may be denoted as $A = \{a_1, a_2, \ldots, a_m\}$, the vertical knowledge learning module 416 learns attribute-specific vertical knowledge and inter-attribute layout vertical knowledge for the given vertical based on the extracted features of the seed site. As previously discussed, the feature extraction module 414 extracts layout features, content features, and context features of the vertical seed site.

The vertical knowledge learning module 416 is configured to learn vertical knowledge by evaluating and analyzing the extracted features for each labeled attribute from the seed site that corresponds to an attribute in A targeted for extraction within the given vertical. Then, based on the evaluation and analysis, the vertical knowledge learning module 416 builds and trains (1) a classifier that provides an estimated probability that a text node t of a new web site is relevant, from the semantic perspective, to a particular targeted attribute $a_j$, and (2) a standard inter-attribute layout among attributes in A that provides a criterion for estimating the correctness of an inter-attribute layout from a new web site.

Attribute-specific vertical knowledge characterizes the semantics of each individual attribute $a_j \in A$ based on the content and context features extracted from the labeled text nodes of the seed site that correspond to each individual attribute $a_j$. Specifically, given a set of labeled text nodes from the seed site, the attribute-specific semantics evaluator 510 learns the semantic knowledge of each attribute $a_j \in A$ from a subset $T_j$ of text nodes that have each been manually labeled as containing a value corresponding to $a_j$.

The attribute-specific semantics evaluator 510 is configured to exploit content features and context features separately because the content features and the context features behave differently, and therefore yield separate vertical knowledge. For example, content features provide information which may be adopted to evaluate any input text of a text node, while context features convey indicative hints which are sufficient and may further help evaluate input text of a text node (i.e. increase a confidence level of accuracy), but are not necessary to evaluate the input text of a text node. This is because context features, in contrast to content features, have more variations across different web sites and may be unavailable (i.e. with null results of feature extraction) on particular web sites.

Accordingly, for each attribute $a_j$ in A targeted for structured web data extraction, the attribute-specific semantics evaluator 510 builds and trains a classifier to incorporate one, two, three, four, or all five types of the content features extracted for the labeled text node(s) that correspond to the targeted attribute. As previously discussed, the vertical seed site may include a plurality of web pages (e.g., different books for sale), and thus, there may be numerous different text nodes from the individual web pages that correspond to the same attribute $a_j$ (e.g., an "author" listed for each book).

Because the different types of content features are heterogeneous, in various embodiments, the attribute-specific semantics evaluator 510 first normalizes each type of content feature for the labeled text nodes prior to incorporation by the classifier. In at least one embodiment, the content features are normalized to a value between one and zero.

In various embodiments, the attribute-specific semantics evaluator 510 normalizes the unigram set content feature by first counting frequencies of tokens for $\{\text{unigram}(t) | t \in T_j\}$, and then normalizing each unigram set for the labeled text nodes based on the average frequency of its element token(s).

In various embodiments, the attribute-specific semantics evaluator 510 normalizes the character type content feature by converting, via a cosine similarity, each feature vector value (e.g., letter, digit, symbol) to a mean of feature vector values for $\{\text{char\_type}(t) | t \in T_j\}$.

In various embodiments, the attribute-specific semantics evaluator 510 normalizes each of the token count content feature, the character count content feature, and the page redundancy content feature, based on their maximum and minimum values determined from analyzing all the labeled text nodes that correspond to $a_j$.

After normalization of each content feature, the attribute-specific semantics evaluator 510 builds a classifier (e.g., a Support Vector Machine) to learn a mapping from the normalized content features of a labeled text node t, to an estimated probability ContentRel (t|$a_j$) that t has content-based relevance to attribute $a_j$. Accordingly, the vertical knowledge learning module 416 is configured to learn vertical knowledge based on content features extracted from a labeled text node of a seed site. The vertical knowledge learning module 416 builds and trains the classifier to provide an estimated probability that an unlabeled text node of the new web site has content-based relevance to a particular attribute $a_j$.

With regard to the context features, for each attribute $a_j$ targeted for structured web data extraction, the attribute-specific semantics evaluator 510 constructs three lookup tables for the preceding text context feature, the prefix context feature, and the suffix context feature, respectively. Each lookup table is derived from the feature values aggregated from each of the text nodes in $T_j$ that correspond to $a_j$. Each lookup table is a set of unique feature values that have been extracted from one or more text nodes. Using the preceding text context feature as an example, when the feature values are "author" extracted from some text nodes and "authors" extracted from some other text nodes, the preceding text lookup table thereby includes two feature values namely "author" and "authors". For each of the three types of context features, a feature value is treated as matching the corresponding lookup table if this feature value is contained in the lookup table. For a text node t, its context-based relevance to $a_j$, ContextRel (t|$a_j$), is defined as the percentage of t's context feature values that match the corresponding lookup table of $a_j$.

The attribute-specific semantics evaluator 510 then combines both the content feature vertical knowledge and the context feature vertical knowledge to provide an overall relevance determination of a text node t to an attribute $a_j$. The estimation probability is, $$\text{Rel}_{TN}(t|a_j) = \max(\text{ContentRel}(t|a_j), \text{ContextRel}(t|a_j)). \quad (7)$$

Here, the max operation( ) leverages the context features in a flexible manner. As previously mentioned, context features may help, but are not necessary when evaluating the input text of a text node due to considerable variations across web sites and possible absence on particular web sites. In other words, while a high context-based relevance score confidently indicates semantic relevance, a low score does not necessarily indicate the absence of semantic relevance. Therefore, context features are relied upon if the corresponding relevance probability is sufficient to confidently indicate that text node t is relevant to an attribute $a_j$. Otherwise, the relevance estimation relies solely on the content-based relevance. In various embodiments, the estimation probability in (7) may be referred to as relevance scores (e.g., page-level).

Inter-attribute layout vertical knowledge characterizes the layout relationships between the individual attributes based on the layout features of corresponding text nodes extracted by the feature extraction module 414, as previously discussed.

The inter-attribute layout is characterized using pair-wise visual distances between two text nodes corresponding to two different attributes within the given vertical. For example, given a set of m attributes, and a labeled seed site identifying the text nodes corresponding to the attributes across multiple web pages, the inter-attribute layout evaluator 512 constructs an m×m layout matrix A'. Each element $A_{ij}$ in A' encodes the average visual distance between the attributes $a_i$ and $a_j$ as, $$A_{ij} = \frac{1}{w_{screen}} \times \frac{\sum \text{VisDist}(t_{a_i}, t_{a_j})}{|P_{a_i \cap a_j}|}. \quad (8)$$

Here, $t_{a_i}$ and $t_{a_j}$ are two text nodes labeled with $a_i$ and $a_j$ respectively on a web page. $P_{a_i \cap a_j}$ is the set of all pages containing the values of both $a_i$ and $a_j$. VisDist($t_{a_i}, t_{a_j}$) is the same determination previously defined with respect to equation (6), as discussed with reference to FIG. 6. In order to calculate the visual distance, the inter-attribute layout evaluator 512 employs the extracted layout features of visual size and visual position of individual text nodes, as previously discussed.

To address the inter-site variations of page size, the inter-attribute layout relationships evaluator 512 normalizes the average distance by the rendering width of a web page, $w_{screen}$, which is usually consistent for each web page in a web site.

Accordingly, the inter-attribute layout evaluator 512 may determine average visual distance between two nodes across multiple web pages to find which two attributes are consistently close to each other (e.g., "publisher" 208 and "publish date" 210 in FIG. 2). The consistency of an inter-attribute layout helps correctly identify attribute values for structured web data extraction.

New Website Adaptation Module

As illustrated in FIG. 5, the new web site adaptation module 418 includes a page-level semantic prediction module 514, an inter-page aggregation module 516, and an inter-attribute re-ranking module 518.

The new web site adaptation module 418 is configured to use the vertical knowledge learned from the labeled seed site to identify attributes for a new web site in the same vertical category as the labeled seed site. As previously discussed, the vertical knowledge learned from a labeled seed site is established based on extracting the aforementioned general features. Therefore, when applying the learned vertical knowledge to a new web site (i.e. an unseen website), the new web site adaptation module 418 may provide a variety of possible candidate text nodes for a targeted attribute. However, some of these candidate text nodes may include of noisy content (e.g. web content not targeted within the vertical), as previously discussed.

Thus, the new web site adaptation module 418 first employs the page-level semantic prediction module 514 to predict whether a text node is relevant to a target attribute. For example, given a DOM tree for a new web page p, whose features have been extracted by the feature extraction module 414, the page-level semantic prediction module 514 associates each text node t on new web page p, with an m-dimensional vector indicating estimated probabilities of semantic relevance for each attribute $a_j$ in A targeted for structured web data extraction within the given vertical.

For example, the page-level semantic prediction module 514 employs the classifier built and trained by the attribute-specific semantics evaluator 510 and the lookup tables, to predict a variety of estimated probabilities (i.e. relevance scores) that text node t is semantically relevant to a variety of target attributes as provided in equation (7). The m-dimensional vector for t is defined as, $$[(\text{Rel}_{TN}(t|a_1), \text{Rel}_{TN}(t|a_2), \ldots, \text{Rel}_{TN}(t|a_m)]. \quad (9)$$

The page-level semantic prediction module 514 associates an m-dimensional vector with each text node on the new web page p.

To determine the value of an attribute $a_j$ on the new web page p, in a straightforward way, the page-level semantic prediction module 514 can assign the attribute to text node $t_{a_j}$, $$t_{a_j} = \mathrm{argmax}_t \mathrm{Rel}_{TN}(t|a_j). \quad (10)$$

Subsequent to the page-level semantic prediction, the new web site adaptation module 418 performs inter-page aggregation to further improve the relevance scores provided via the page-level semantic predictions by exploiting inter-page dependencies. For example, page-level semantic predictions may include some minor inaccuracies due to inter-site variations of attributes and the general features used to characterize the vertical knowledge.

Thus, the inter-page aggregation module 516 is configured to use site-level information to improve the relevance scores for the text nodes and increase the confidence in identifying target attributes for the given vertical. Again, the inter-page semantics of selective text nodes may be consistent across multiple web pages within a web site. Accordingly, the inter-page aggregation module 516 seeks to align similar text nodes from multiple web pages. Two or more text nodes may be aligned if they both have the same, or a similar, DOM path and context features (e.g., the "author" attribute in FIGS. 1 and 2 may have the same DOM path feature and preceding text feature across multiple web pages). A set of aligned text nodes is called a data field, denoted by D (e.g., the set of "author" text nodes). Accordingly, the inter-page aggregation module 516 determines one or more data fields for the multiple web pages within a new web site. The detailed algorithm of aggregating text nodes into data fields is provided in Algorithm 1, which given a set of web pages $\rho_{sample}$, returns $\mathbb{D}$ which includes all possible data fields in $\rho_{sample}$. Algorithm 1 is as follows:

```
 1:  𝔻 = 0
 2:  Initialize an empty hash-table ℋ
 3:  for all pages p in ρ_sample do
 4:      for all text nodes t in p do
 5:          h = GenHashValue (dom(t), preceding(t), prefix(t),
              suffix(t))
 6:          if ℋ contains the key h then
 7:              Get the data field D associated with h from ℋ
 8:              Add t do D
 9:          else
10:              Create a new data field D = {t}
11:              Add to ℋ the new key h associated with D
12:          end if
13:      end for
14:  end for
15:  for all ( h, D) pairs in ℋ do
16:      if |D| ≥ 0.5| ρ_sample| then
17:          Add D to 𝔻
18:      end if
19:  end for
20:  return 𝔻
```

Once a set of aligned text nodes are aggregated into a data field, the inter-page aggregation module 516 may aggregate the page-level relevance scores for the aligned text nodes, as previously discussed with respect to equation (9), to create data field relevance scores corresponding to the targeted attributes. The attribute relevance vector associated with estimated probabilities of a data field D is computed by averaging page-level relevance scores over the member text nodes in a data field D, $$[(\mathrm{Rel}_{DF}(D|a_1), \mathrm{Rel}_{DF}(D|a_2), \ldots, \mathrm{Rel}_{DF}(D|a_m)]. \quad (11)$$

Here, $$\mathrm{Rel}_{DF}(D|a_j) = \frac{1}{|D|} \sum_{t \in D} \mathrm{Rel}_{TN}(t|a_j). \quad (12)$$

Based on such data field relevance scores, each attribute $a_j$ may be directly associated with a data field $D_{a_j}$, $$D_{a_j} = \mathrm{argmax}_{D \in \mathbb{D}} \mathrm{Rel}_{DF}(D|a_j). \quad (13)$$

Here, $\mathbb{D}$ is the set of all data fields obtained from text nodes within a new web site.

After attributes have been assigned to a data field, the new web site adaptation module 418, is configured to provide an assembly defined as, $$\mathbb{S}_{\mathcal{A}} = \{D_{a_1}, \ldots, D_{a_m}\}. \quad (14)$$

The assembly $\mathbb{S}_{\mathcal{A}}$ is a solution that associates text nodes for the multiple web pages of a new web site with the target attributes A, so that the target attribute values can be extracted by the online search engines and/or online knowledge databases. A threshold may be set to remove data fields with low relevance scores in $\mathbb{S}_{\mathcal{A}}$, since some attributes may be unavailable, or not presented, on particular web pages or particular web sites.

Thus, aggregation of page-level semantic relevance scores to site-level data field relevant scores is noise insensitive and makes identifying target attributes within a new web site more robust. However, there may still be some minor inaccuracies, and therefore, in various embodiments, the new web site adaptation module 418 may use inter-attribute layout relationships between candidate data fields for target attributes to even further complement and improve the results.

For example, a publish date, 210 in FIG. 2, may consistently be the closest node to a book publisher 208. Therefore, it may be beneficial to exploit such inter-attribute layout characteristics (e.g., based on the extracted layout features) and re-rank the possible solutions.

In order to re-rank possible solutions associating a set of aligned text nodes with a targeted attribute, the inter-attribute re-ranking module 518 maintains several candidate data fields for each target attribute $a_j$. The inter-attribute re-ranking module 518 first sorts the candidate data fields in descending order according to their data field relevance scores, $\mathrm{Rel}_{DF}$ $(D|a_j)$, as previously discussed with reference to equation (12). In various embodiments, the inter-attribute re-ranking module 518 then truncates the sorted list of candidate data fields at a maximum drop point, yielding only top-ranked set of data fields as candidates for $a_j$. Given a sorted list of elements associated with descending scores, the maximum drop point can be considered as a position between two successive elements whose score drop (i.e., difference in scores) is greater than any other score drop between two successive elements.

Then the inter-attribute re-ranking module 518 enumerates any possible combination of attributes' data fields as a candidate solution to target attributes A. For example, each target attribute may only be assigned to one data field, and therefore, different combinations may result.

From the semantic perspective, confidence of a candidate solution $\mathbb{S}_{\mathcal{A}}^*$ is defined as, $$\mathrm{Conf}_{semantics}(\mathbb{S}_{\mathcal{A}}^*) = \Sigma_{j=1}^m \mathrm{Rel}^{DF}(D_{a_j}|a_j), D_{a_j} \in \mathbb{S}_{\mathcal{A}}^*. \quad (15)$$

To measure the confidence from the layout perspective, i.e., based on inter-attribute layout vertical knowledge learned from a labeled seed site, denoted by layout matrix A', the inter-attribute re-ranking module 518 first computes a layout matrix $A^{layout}$ for $\mathbb{S}_\mathcal{A}^*$, following equation (8), using the extracted layout features previously discussed. Then, analogous to cosine similarity, the layout confidence $\mathbb{S}_\mathcal{A}^*$ is defined as, $$Conf_{layout}(\mathbb{S}_\mathcal{A}^*) = \frac{\langle A^{layout}, A \rangle}{\|A^{layout}\|_F \cdot \|A\|_F}. \quad (16)$$

Here the numerator denotes an element-wise inner product, and the $\|*\|_F$ is the Frobenius norm. The optimal solution $\mathbb{S}_\mathcal{A}$ is the one with the highest overall confidence, defined as, $$\mathbb{S}_\mathcal{A} = \mathrm{argmax}_{\mathbb{S}_\mathcal{A}^*}(Conf_{semantics}(\mathbb{S}_\mathcal{A}^*) \times Conf_{layout}(\mathbb{S}_\mathcal{A}^*)). \quad (17)$$

Accordingly, the inter-attribute re-ranking module 518 essentially re-ranks the different candidate solutions based on layout features and inter-attribute layout vertical knowledge learned from a labeled seed site, in order to find the optimal solution $\mathbb{S}_\mathcal{A}$, or assembly of text nodes associated with each target attribute. Once the optimal solution is identified, the data extraction module 420 extracts the corresponding attribute values from the text nodes of the multiple web pages in the new web site. This is repeated for numerous different web sites within the given vertical.

Illustrative Processes

Figure 7:
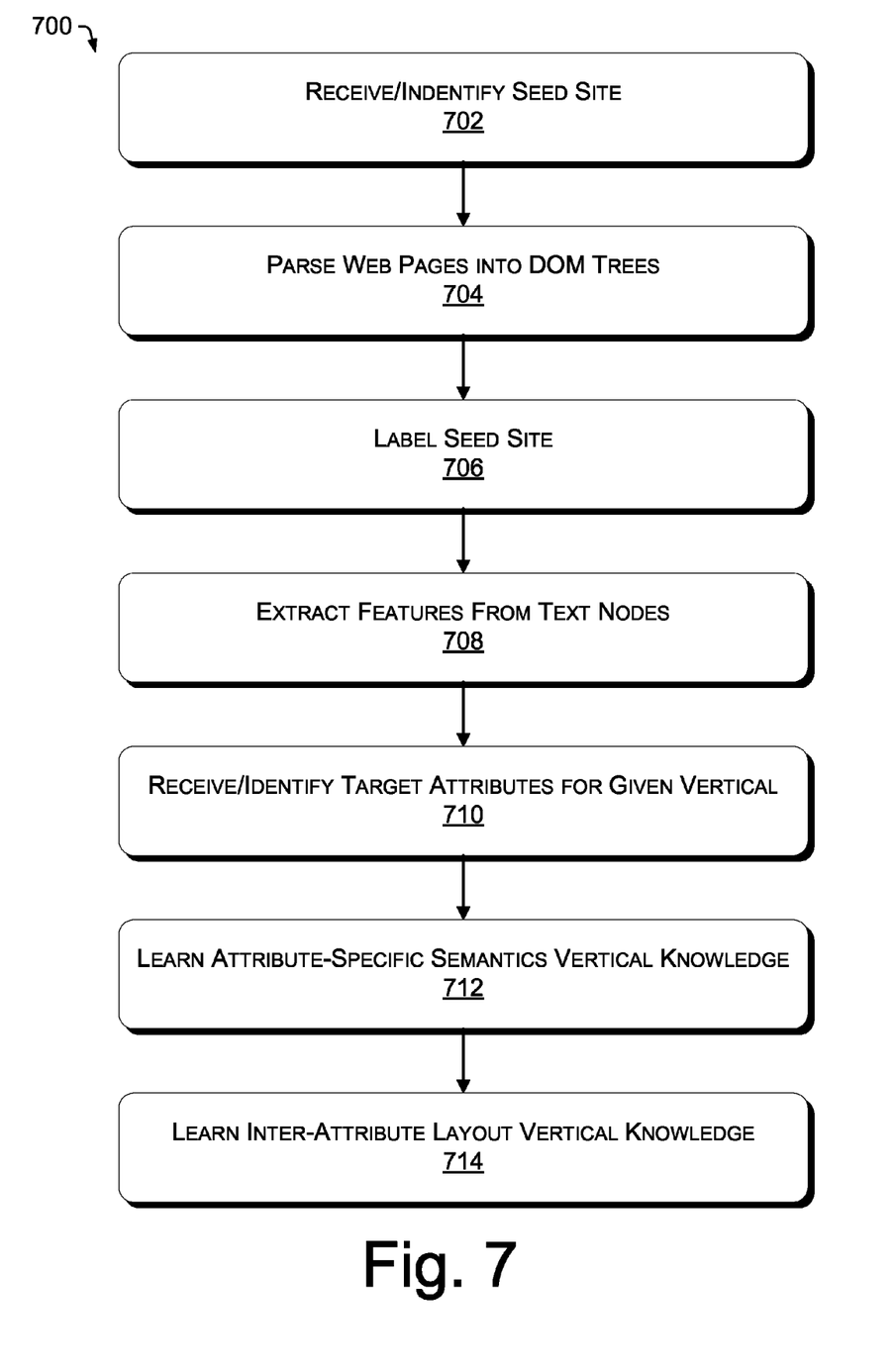
FIG. 7 illustrates an example process that labels a seed site and learns vertical knowledge, in accordance with various embodiments.
Figure 8:
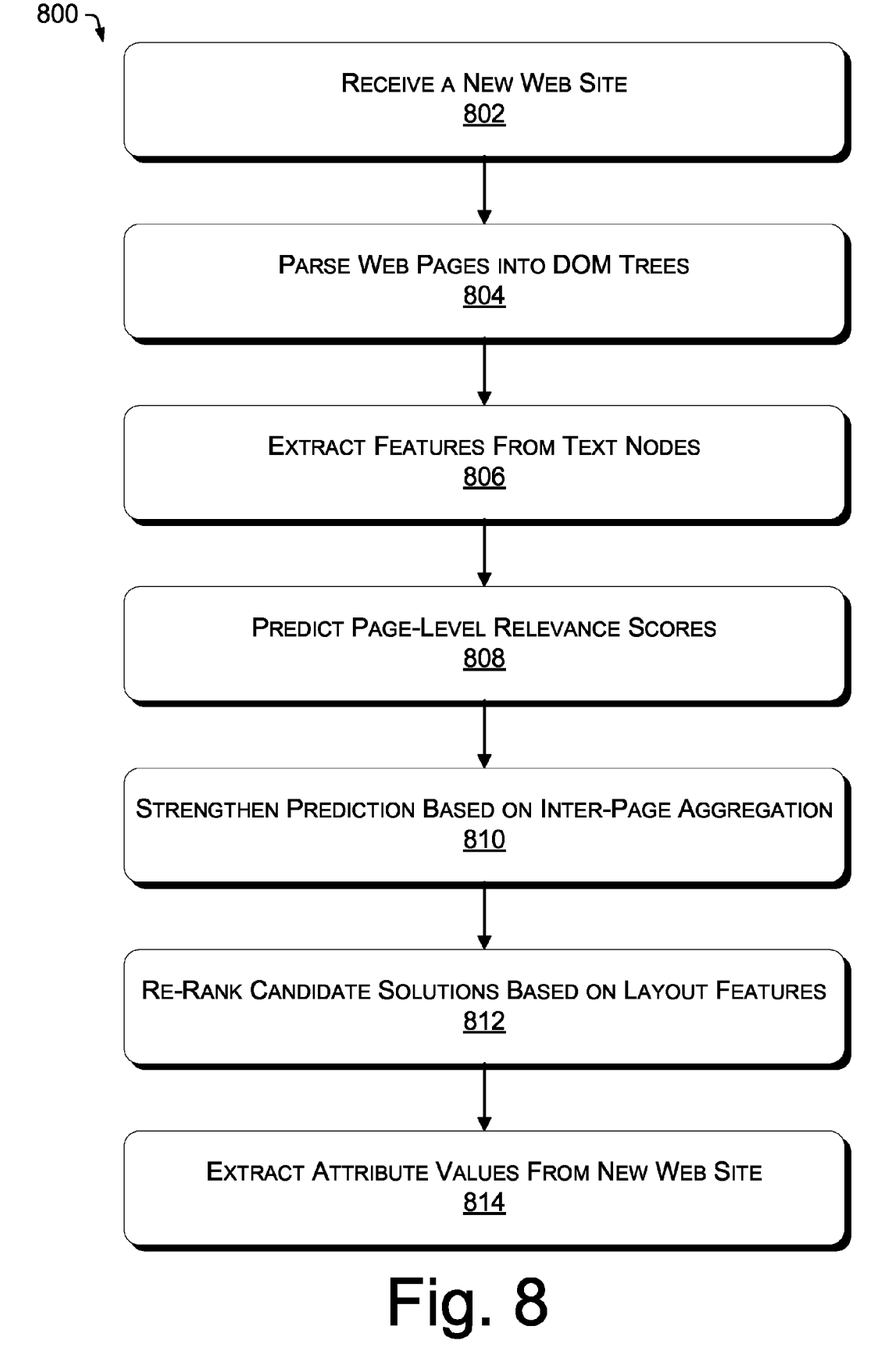
FIG. 8 illustrates an example process that adapts/applies the learned vertical knowledge and extracts data, in accordance with various embodiments.

Example operations are described herein with reference to FIG. 7 and FIG. 8. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 illustrates an example process 700 that learns vertical knowledge from a labeled seed site. At block 702, a seed site for a given vertical is identified or received. For example, the seed site may be identified based on a popularity of a web site, the amount of traffic a web site, a random selection, etc. In various embodiments, only one seed site per given vertical is identified for labeling. In at least one embodiment, multiple seed sites per given vertical may be identified for labeling. However, if multiple seed sites are labeled, it is a limited number (e.g., two, three or four) so that human time and effort is limited.

At block 704, the feature extraction module 414 parses the different web pages for the identified seed site into multiple DOM trees, so that the features can be extracted for the different text nodes.

At block 706, one or more humans manually analyze the seed site and the value in each of the text nodes, and assign a label to each of the text nodes whose value corresponds to an attribute within the given vertical. In one embodiment, the one or more humans label text nodes associated with a specified or predefined set of attributes for the given vertical At block 708, the feature extraction module 414 extracts layout, content, and context features from the labeled text nodes, as previously discussed with respect to FIGS. 5 and 6.

At block 710, the vertical knowledge learning module 416 receives or identifies a set of target attributes for the given vertical. The target attributes are the attributes selected for structured web data extraction by an online search engine or an online knowledge database.

At block 712, the vertical knowledge learning module 416 employs the attribute-specific semantics evaluator 510 to learn attribute-specific semantic vertical knowledge based on the extracted content and context features and the human labels.

At block 714, the vertical knowledge learning module 416 employs the inter-attribute layout evaluator 512 to learn inter-attribute layout vertical knowledge based on the extracted layout features and the human labels.

In various embodiments, the process illustrated in FIG. 7 is repeated for a plurality of verticals. For example, the process may be repeated for separate verticals corresponding to cars, restaurants, cameras, computers, cell phones, professional player profiles, celebrity biographies, movies, or any other web category for which structured web data extraction would be useful to a company, a person, for market research, for product comparison, etc.

FIG. 8 illustrates an example process 800 that applies the vertical knowledge learned in FIG. 7, to a new web site in the same vertical as the labeled seed site. In various embodiments, a new web site may come from a group of web sites identified by an independent software program as being part of a given vertical.

At block 802, the new web site adaptation module 418 receives a new web site.

At block 804, the feature extraction module 414 parses the different web pages for the new web site into multiple DOM trees, so that the features can be extracted for the different text nodes.

At block 806, the feature extraction module 414 extracts layout, content, and context features from the text nodes, as previously discussed with respect to FIGS. 5 and 6.

At block 808, the new web site adaptation module 418 applies the learned attribute-specific vertical knowledge and employs the page-level semantic prediction module 514 to predict page-level relevance scores for each text node, the page-level relevance scores associating the text nodes with target attributes for the given vertical.

At block 810, in various embodiments, the new web site adaptation module 418 employs the inter-page aggregation module 514 to refine the page-level relevance scores by aggregating the page-level relevance scores for the multiple pages in the new web site into site-level data field relevance scores. Accordingly, this site-level aggregation serves as inter-page constraints that improve page-level identification of attribute values by removing any false positive values that may not be consistent across the multiple web pages, or may not be supported by enough of the multiple web pages.

At block 812, in various embodiments, the new web site adaptation module 418 employs the inter-attribute re-ranking module 514 to re-rank candidate solutions based on layout features and the learned inter-attribute layout vertical knowledge so that an optimal candidate solution is identified.

At block 814, the data extraction module 420 extracts attribute values from text nodes associated with the target attributes based on block 808, block 810, block 812, or a combination thereof.

In various embodiments, the features extracted from a new web site may serve as another labeled seed site that provides further vertical knowledge to the vertical knowledge learning module 416. This may be considered as a feedback or bootstrapping process.

In various embodiments, the process illustrated in FIG. 8 is repeated for a plurality of new web sites in a given vertical so that an online search engine or an online knowledge database is provided with a sufficient amount of structured web data.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method comprising:
receiving one or more seed sites that present information relating to a category of products or services, an individual seed site including a plurality of labeled text nodes identifying attributes targeted in association with data extraction for the category of products or services;
extracting features from the plurality of labeled text nodes;
learning, by a processor, category knowledge for the category of products or services based at least in part on the features extracted from the plurality of labeled text nodes, the category knowledge characterizing attribute-specific semantics of the plurality of labeled text nodes;
receiving a new web site that presents information relating to the category of products or services;
identifying, based on the category knowledge, one or more attributes on the new web site; and
extracting one or more values from the one or more attributes identified.

2. The method as recited in claim 1, wherein the identifying, based on the category knowledge, one or more attributes on the new web site comprises:
extracting new features from one or more unlabeled text nodes on the new web site;
predicting page level relevance scores based at least in part on the new features extracted from the new web site and the category knowledge, the page level relevance scores indicating a probability that an individual unlabeled text node of the one or more unlabeled text nodes is associated with a particular attribute targeted for identification;
employing inter-page aggregation to refine the page level relevance scores and determine candidate attribute solutions for the one or more unlabeled text nodes on the new web site; and
re-ranking the candidate attribute solutions based on layout features extracted from the new web site.

3. The method as recited in claim 1, wherein the features extracted from the plurality of labeled text nodes include layout features comprising at least one of a Domain Object Model (DOM) path, a visual size, or a visual position.

4. The method as recited in claim 1, wherein the features extracted from the plurality of labeled text nodes include content features comprising at least one of a unigram set, a token count, a character count, a character type, or a page redundancy.

5. The method as recited in claim 1, wherein the features extracted from the plurality of labeled text nodes include context features comprising at least one of a preceding text, a prefix, or a suffix.

6. The method as recited in claim 1, wherein the category knowledge characterizes inter-attribute layout relationships of the plurality of labeled text nodes.

7. The method as recited in claim 1, further comprising receiving a manual label for each of the plurality of labeled text nodes.

8. The method as recited in claim 1, wherein an individual seed site includes a plurality of web pages.

9. The method as recited in claim 8, wherein each of the plurality of web pages is parsed into respective DOM trees that provide the plurality of labeled text nodes.

10. The method as recited in claim 1, using the one or more attributes on the new web site to learn additional category knowledge.

11. A system comprising:
one or more processors; and
a memory, coupled to the one or more processors, storing executable instructions including:
a feature extraction module configured to extract features from labeled text nodes for a seed site associated with a vertical of products or services, individual labeled text nodes being associated with an identified attribute targeted for data extraction within the vertical of products or services;
a vertical knowledge learning module configured to learn vertical knowledge that characterizes attribute-specific semantics for the vertical of products or services based at least in part on the features extracted;
a new web site adaptation module configured to apply the vertical knowledge to an unseen web site and to associate individual text nodes of the unseen web site with an attribute targeted for data extraction within the vertical of products or services; and
a data extraction module configured to extract values from the individual text nodes of the unseen web site.

12. The system of claim 11, wherein the features extracted from the labeled text nodes include layout features comprising at least one of a Domain Object Model (DOM) path, a visual size, or a visual position.

13. The system of claim 11, wherein the features extracted from the labeled text nodes include content features comprising at least one of a unigram set, a token count, a character count, a character type, or a page redundancy.

14. The system of claim 11, wherein the features extracted from the labeled text nodes include context features comprising at least one of a preceding text, a prefix, or a suffix.

15. The system of claim 11, wherein the new web site adaptation module is further configured to:
extract new features from the individual text nodes of the unseen web site;
predict page level relevance scores based at least in part on the new features extracted from the unseen web site and the vertical knowledge, the page level relevance scores indicating a probability that an individual text node is associated with a particular attribute targeted for data extraction within the vertical of products or services;
employ inter-page aggregation to improve the page level relevance scores and determine candidate attribute solutions for the individual text nodes of the unseen web site; and
re-rank the candidate attribute solutions based on layout features extracted from the unseen web site.

16. A method comprising:
receiving a web site that presents information relating to a particular vertical;
identifying one or more text nodes on the web site;

extracting, by one or more processors, a set of features from individual text nodes of the one or more text nodes identified on the web site;

predicting text node relevance scores for the individual text nodes of the one or more text nodes identified on the web site based at least in part on the features extracted from an individual text node and vertical knowledge characterizing attribute-specific semantics of attributes targeted for data extraction, the text node relevance scores indicating a probability that an individual text node of the one or more text nodes is associated with an attribute targeted for extraction; and identifying, based in part on the text node relevance scores, individual text nodes of the one or more text nodes on the web site as a particular attribute targeted for extraction.

17. The method as recited in claim 16, wherein the text node relevance scores are page-level relevance scores, the method further comprising:

averaging the page-level relevance scores across multiple web pages of the web site; and determining candidate attribute solutions of aligned text nodes for the multiple web pages based on the averaged page-level relevance scores, the candidate attribute solutions identifying the aligned text nodes as a particular attribute targeted for extraction.

18. The method as recited in claim 17, further comprising:

re-ranking the candidate attribute solutions based on layout features extracted from the web site; and identifying the aligned text nodes as a particular attribute targeted for extraction based at least in part on the re-ranked candidate attribute solutions.

* * * * *